US008856070B2

(12) United States Patent
Cadarette et al.

(10) Patent No.: US 8,856,070 B2
(45) Date of Patent: Oct. 7, 2014

(54) CONSISTENT REPLICATION OF TRANSACTIONAL UPDATES

(71) Applicant: International Business Machines Corporation, Armonk, NY (US)

(72) Inventors: Paul M. Cadarette, Hemet, CA (US); Martin W. Cocks, Eastleigh (GB); Robert D. Love, Littleton, NC (US); John S. Tilling, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 13/723,984

(22) Filed: Dec. 21, 2012

(65) Prior Publication Data

US 2014/0181017 A1    Jun. 26, 2014

(51) Int. Cl.
*G06F 17/30* (2006.01)

(52) U.S. Cl.
CPC ............................ *C06F 17/30008* (2013.01)
USPC ........... 707/615; 707/616; 707/626; 707/634; 707/635; 707/637; 707/638

(58) Field of Classification Search
CPC .................................................. G06F 17/30008
USPC .......... 707/615, 616, 626, 634, 635, 637, 638
See application file for complete search history.

(56) References Cited

U.S. PATENT DOCUMENTS

| 5,640,561 | A | | 6/1997 | Satoh et al. | |
|---|---|---|---|---|---|
| 5,956,489 | A | * | 9/1999 | San Andres et al. | 709/221 |
| 6,823,355 | B1 | * | 11/2004 | Novaes et al. | 709/201 |
| 7,240,054 | B2 | * | 7/2007 | Adiba et al. | 1/1 |
| 7,483,922 | B1 | * | 1/2009 | Edlund et al. | 1/1 |
| 7,613,751 | B2 | * | 11/2009 | Tom et al. | 1/1 |
| 8,086,566 | B2 | * | 12/2011 | Edlund et al. | 707/615 |
| 8,121,992 | B2 | | 2/2012 | Hanus et al. | |
| 8,140,483 | B2 | | 3/2012 | Mitchell et al. | |
| 8,140,886 | B2 | | 3/2012 | Lehr et al. | |
| 2002/0194015 | A1 | * | 12/2002 | Gordon et al. | 705/1 |
| 2005/0192989 | A1 | * | 9/2005 | Adiba et al. | 707/101 |
| 2007/0132516 | A1 | * | 6/2007 | Mattes et al. | 331/16 |
| 2007/0226276 | A1 | | 9/2007 | Suzuki et al. | |
| 2009/0119351 | A1 | * | 5/2009 | Edlund et al. | 707/204 |
| 2013/0110774 | A1 | * | 5/2013 | Shah et al. | 707/610 |
| 2013/0110781 | A1 | * | 5/2013 | Golab et al. | 707/638 |

OTHER PUBLICATIONS

Addison, Ed, "CICS and Transactional VSAM," IBM, Websphere Support, Apr. 5, 2007.
IBM, "Using the Log Stream Copy Utility to Copy Your MVS Log Streams," Jan. 6, 2008.
VSAM Updates, IBM, Dec. 2006.
Zemblowski, Steve, "CICS Tools Overview," IBM, 2005.
Arnell, "CICS and VSAM Record Level Sharing," IBM, 1998.

* cited by examiner

*Primary Examiner* — Frantz Coby
(74) *Attorney, Agent, or Firm* — Steven M. Greenberg, Esq.; CRGO Law

(57) ABSTRACT

Embodiments of the present invention provide a method, system and computer program product for consistent replication of transactional updates. In an embodiment of the invention, a method for consistent replication of data in a transaction processing system is provided. The method includes recording entries in a replication log of different data updates and corresponding transactions and additionally recording entries in the replication log indicating whether or not the transactions have been backed out. The method also includes replicating only those data updates referenced in the log which do not correspond to transactions indicated in the log to have been backed out. For instance the additionally recorded entries in the replication log indicate when a transaction has been backed out. Alternatively, the additionally recorded entries in the replication log indicate when a transaction has been committed.

6 Claims, 1 Drawing Sheet

CONSISTENT REPLICATION OF TRANSACTIONAL UPDATES

BACKGROUND OF THE INVENTION

1. Field of the Invention

The present invention relates to atomic transactional updates in a transaction processing system and more particularly to replication of transactionally updated data in a transaction processing system.

2. Description of the Related Art

A transaction processing system is a type of information system that collects, stores, modifies, and retrieves organizational transactions. In this regard, a transaction is an event that generates or modifies data that is eventually stored in an information system. To be considered a transaction processing system the "ACID" test must be satisfied. In this regard, the "ACID" test refers to a test for atomicity, consistency, isolation, durability as a set of properties that guarantee database transactions are processed reliably.

The essence of a transaction processing system is that the data of the transaction processing system data must be left in a consistent state. That is to say, for a compound transaction, for the transaction to complete successfully, all portions of the transaction must complete successfully. Otherwise, any changes resulting from the partial completion of the transaction must be "rolled back" to the state that existed prior to the initiation of the compound transaction. While this type of integrity must be provided also for batch transaction processing, it is particularly important for real time processing. Other transaction monitor functions include deadlock detection and resolution resulting from cross-dependence on data, and transaction logging in trace logs for forward recovery in case of transaction failures requiring debugging.

Transaction processing is not limited to a centralized computing architecture. Rather, as a matter of best practices, transaction processing has been deployed within a distributed computing architecture. Within a distributed computing architecture, different servers, whether virtual or real, replicate data between one another so that each server maintains an identical set of working data thereby permitting the manipulation of the data in any selected server. Consequently, redundancy can be achieved for the purpose of high availability or disaster recovery, without requiring an end user to remain captive to any particular one of the servers. Yet, while advantageous, replicating data in a transaction processing system is not without its perils.

In this regard, when performing replication in a transaction processing system, only updates to records that are not to be rolled back and are committed should be replicated to a different server so that the data in the different server is not exposed to data inconsistency in the event that the data is rolled back in the origin server. To combat this potential inconsistency, log files are typically employed such that the different server can inspect the log file to determine whether or not replicated data need also be rolled back as it had been on a source server. However, where multiple log files are employed, coordinating a common understanding of updates and roll backs to ensure consistency in replication can be challenging.

BRIEF SUMMARY OF THE INVENTION

Embodiments of the present invention address deficiencies of the art in respect to transactional update replication and provide a novel and non-obvious method, system and computer program product for consistent replication of transactional updates. In an embodiment of the invention, a method for consistent replication of data in a transaction processing system is provided. The method includes recording entries in a replication log of different data updates and corresponding transactions and additionally recording entries in the replication log indicating whether or not the transactions have been backed out. The method also includes replicating only those data updates referenced in the log which do not correspond to transactions indicated in the log to have been backed out. For instance the additionally recorded entries in the replication log indicate when a transaction has been backed out. Alternatively, the additionally recorded entries in the replication log indicate when a transaction has been committed.

In another embodiment of the invention, a transaction processing system can be configured for consistent replication of data. The system can include a host server computer coupled to different remote servers over a computer communications network and a data store of data coupled to the host server and a different data store of data coupled to one of the remote servers. The system also can include a transaction processing system executing in memory of the host server computer and generating data updates in the data store coupled to the host server computer. The system yet further can include a replicator executing in memory of the host server computer replicating data updates from the data store coupled to the host server computer to the data store coupled to the one of the remote servers.

Finally, the system can include a consistent replication module executing in the memory of the host server computer. The module can include program code enabled to record entries in a replication log of different data updates and corresponding transactions performed by the transaction processing system, to additionally record entries in the replication log indicating whether or not the transactions have been backed out, and to direct the replicator to replicate only those data updates referenced in the log which do not correspond to transactions indicated in the log to have been backed out.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the consistent replication of data in a transaction processing system. In accordance with an embodiment of the invention, transaction log of updates can be established and log entries for data updates in a transaction written thereto. Additional entries can be written to the log for corresponding transactions for which related data updates may be replicated. Thereafter, during replication the log can be inspected by a remote server and only those data updates associated with a corresponding transaction with an entry in the log permitting replication are replicated to the remote server.

Figure 1:
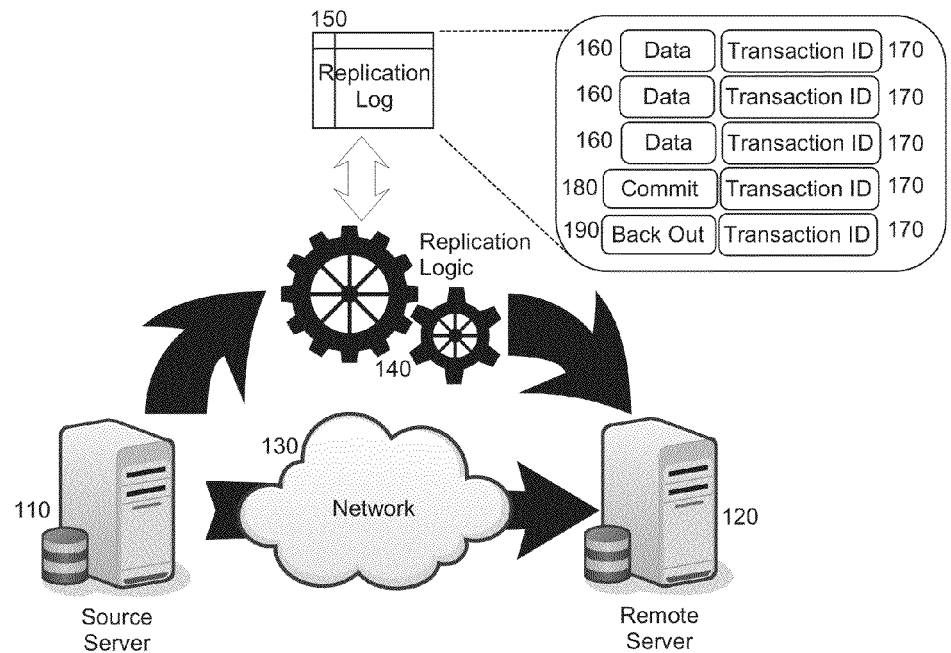
FIG. 1 is a pictorial illustration of a process for consistent replication of data in a transaction processing system.

In further illustration, FIG. 1 pictorial shows a process for consistent replication of data in a transaction processing system. As shown in FIG. 1, replication logic 140 can direct replication of data from a source server 110 to a remote server 120 over a computer communications network 130. Replication logic 140 additionally can maintain one or more replication logs 150 into which data updates 160 applied in the source server 110 can be recorded. The entries in the replication logs 150 additionally can relate each of the data updates 160 to a corresponding transaction identifier 170 so that a set of the data updates 160 can be correlated to a corresponding, single transaction.

Of note, whenever a transaction is backed out, a back out record 190 can be written to the replication log 150. (Alternatively, whenever a transaction is committed, a back out record 190 acting as a "commit record" can be written to the replication log 150 indicating that the transaction has not been backed out) The back out record 190 can be associated in the back out record 190 to a corresponding transaction identifier. Additionally, data updates resulting from the backing out of a corresponding transaction can be omitted from reference in the replication log 150. In this way, as the remote server 120 replicates data updates 160 referenced in the replication log 150, data updates 160 which are associated with a transaction that has been backed out can be excluded from replication and only those of the data updates referenced in the replication log 150 which are associated with a committed transaction can be replicated from the source server 110 to the remote server 120.

Figure 2:
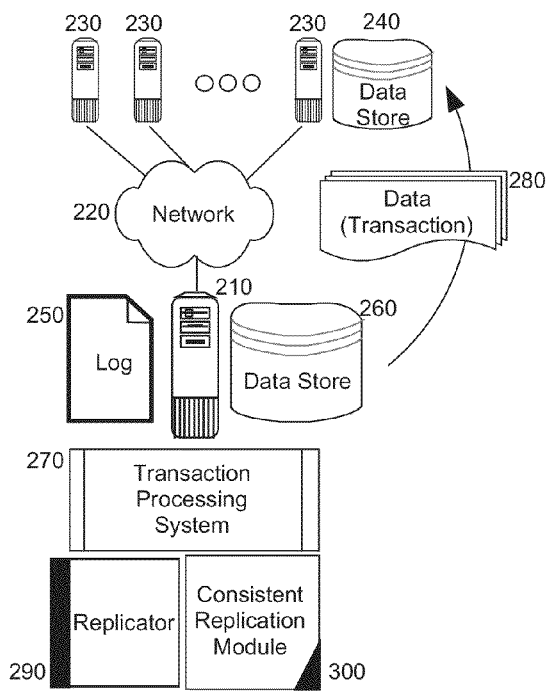
FIG. 2 is a schematic illustration of a transaction processing system configured for consistent replication of data; and, FIG. 3 is a flow chart illustrating a process for consistent replication of data in a transaction processing system.

The process described in connection with FIG. 1 can be implemented within a transaction processing system. In yet further illustration, FIG. 2 schematically shows a transaction processing system configured for consistent replication of data. The system can include a host server computer 210 with at least one processor and memory configured for communicative coupling to other servers 230 over computer communications network 220. Each of the host server computer 210 and the other servers 230 can include a corresponding data store 260, 240 (only a single data store 240 shown in connection with the other server 230 for the purpose of illustrative simplicity). The host server computer 210 can support the execution of a transaction processing system 270. A replicator 290 additionally can be provided. The replicator 290 can be configured to replicate data between the data stores 240, 260 that has been produced in consequence of different transactions in the transaction processing system 270.

Of note, a consistent replication module 300 can be coupled to the replicator 290 and the transaction processing system 270. The consistent replication module 300 can include program code that when executed in the memory of the host server computer 210, can be enabled to create entries in a replication log 250 indicating not only data updates in the transaction processing system in connection with different transactions, but also the replication log 250 can indicate when certain transactions have been either committed or backed out. The program code of the consistent replication module 300 additionally can be enabled to direct replication of data updates between the data stores 240, 260 only when those data updates are not part of a transaction that has been backed out as indicated by the replication log 250.

Figure 3:
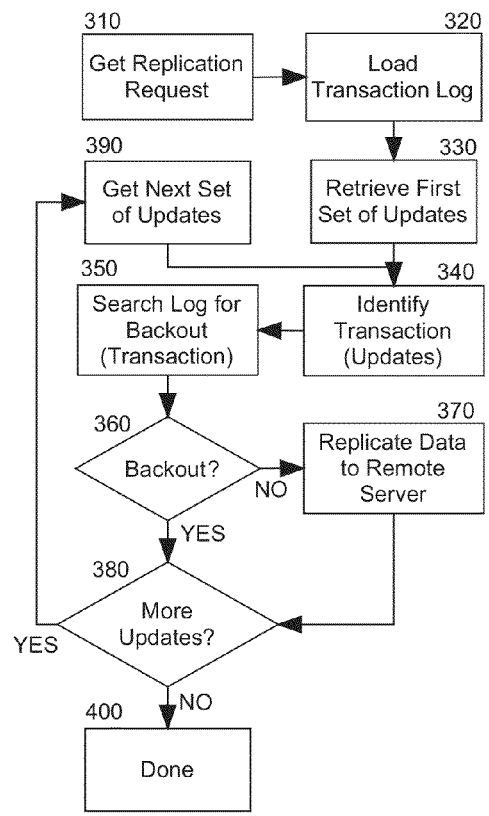

In even yet further illustration of the operation of the consistent replication module, FIG. 3 is a flow chart illustrating a process for consistent replication of data in a transaction processing system. Beginning in block 310, a replication request can be received in connection with a data store. In block 320, a transaction log for transactions in the transaction processing system can be loaded for inspection and in block 330, a first set of data updates for a corresponding transaction can be determined in block 340. In block 350, the log can be searched for a backout record of the corresponding transaction. In decision block 360, if a backout record can be found indicating that the transaction has been backed out, the corresponding data updates for the backed out transaction can be omitted from replication. Otherwise, in block 370 the corresponding data updates can be replicated to the remote server. In decision block 380, if additional data updates remain to be processed in the replication log, the process can return to block 390 with the retrieval of a next set of data updates. Otherwise, the process can end in block 400.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A transaction processing system configured for consistent replication of data, the system comprising:
   a host server computer coupled to different remote servers over a computer communications network;
   a data store of data coupled to the host server and a different data store of data coupled to one of the remote servers;
   a transaction processing system executing in memory of the host server computer and generating data updates in the data store coupled to the host server computer;
   a replicator executing in memory of the host server computer replicating data updates from the data store coupled to the host server computer to the data store coupled to the one of the remote servers; and,
   a consistent replication module executing in the memory of the host server computer, the module comprising program code enabled to record entries in a replication log of different data updates and corresponding transactions performed by the transaction processing system, to additionally record entries in the replication log indicating whether or not the transactions have been backed out, and to direct the replicator to replicate only those data updates referenced in the log which do not correspond to transactions indicated in the log to have been backed out.

2. The system of claim 1, wherein the additionally recorded entries in the replication log indicate when a transaction has been backed out.

3. The system of claim 1, wherein the additionally recorded entries in the replication log indicate when a transaction has been committed.

4. A computer program product for consistent replication of data in a transaction processing system, the computer program product comprising:

a computer readable storage medium having computer readable program code embodied therewith, the computer readable program code comprising:

computer readable program code for recording entries in a replication log of different data updates and corresponding transactions;

computer readable program code for additionally recording entries in the replication log indicating whether or not the transactions have been backed out; and, computer readable program code for replicating only those data updates referenced in the log which do not correspond to transactions indicated in the log to have been backed out.

5. The computer program product of claim 4, wherein the additionally recorded entries in the replication log indicate when a transaction has been backed out.

6. The computer program product of claim 4, wherein the additionally recorded entries in the replication log indicate when a transaction has been committed.

* * * * *